July 5, 1966  J. W. ROSS  3,258,935
FOOD FREEZING APPARATUS
Filed May 27, 1963　　　　　　　　　　　　2 Sheets-Sheet 1
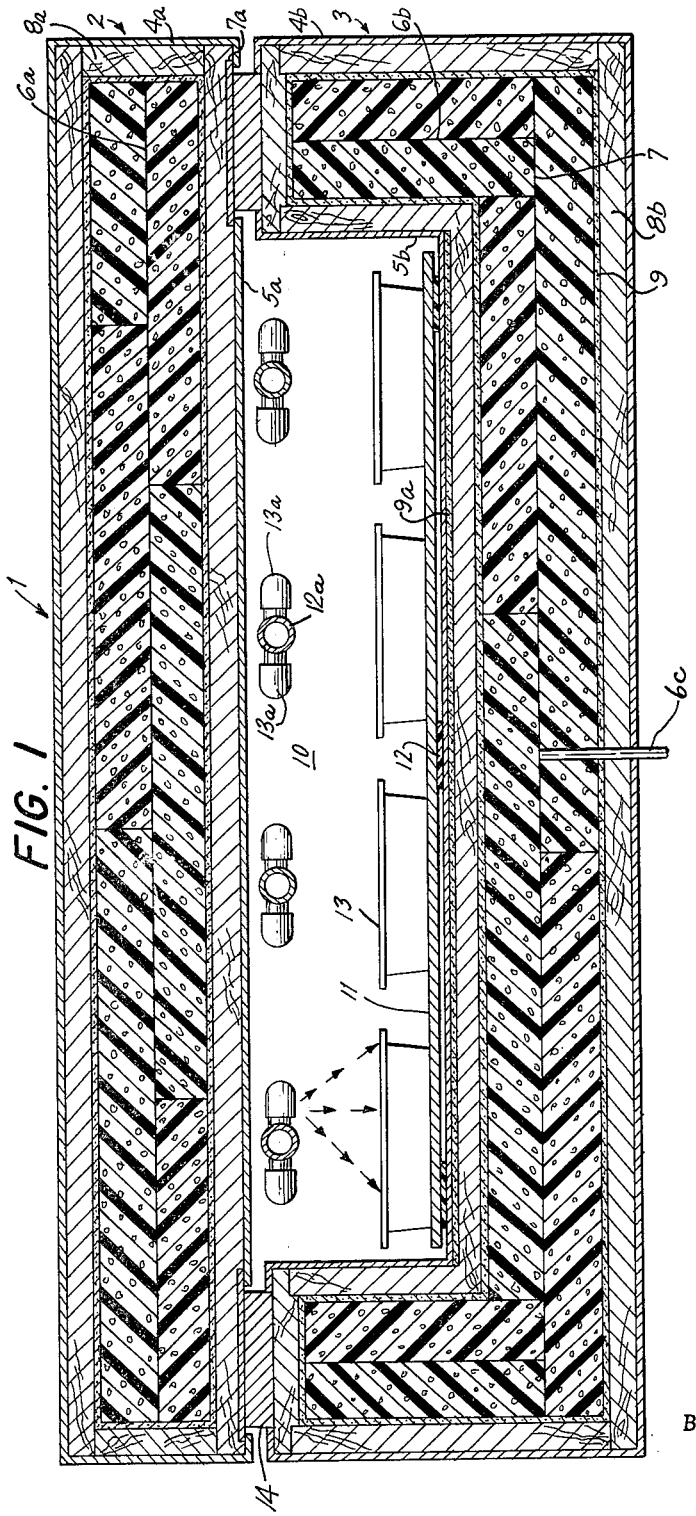
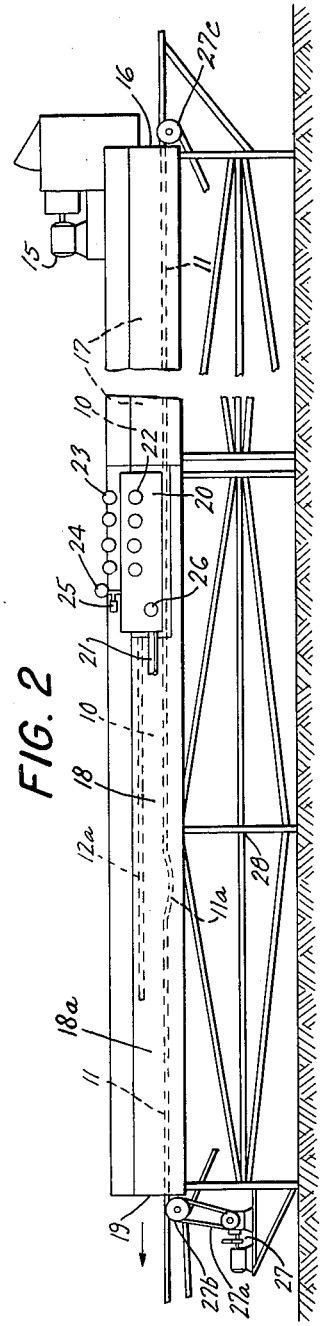
INVENTOR.
JOHN W. ROSS
BY Eugene C. [signature]
ATTORNEY

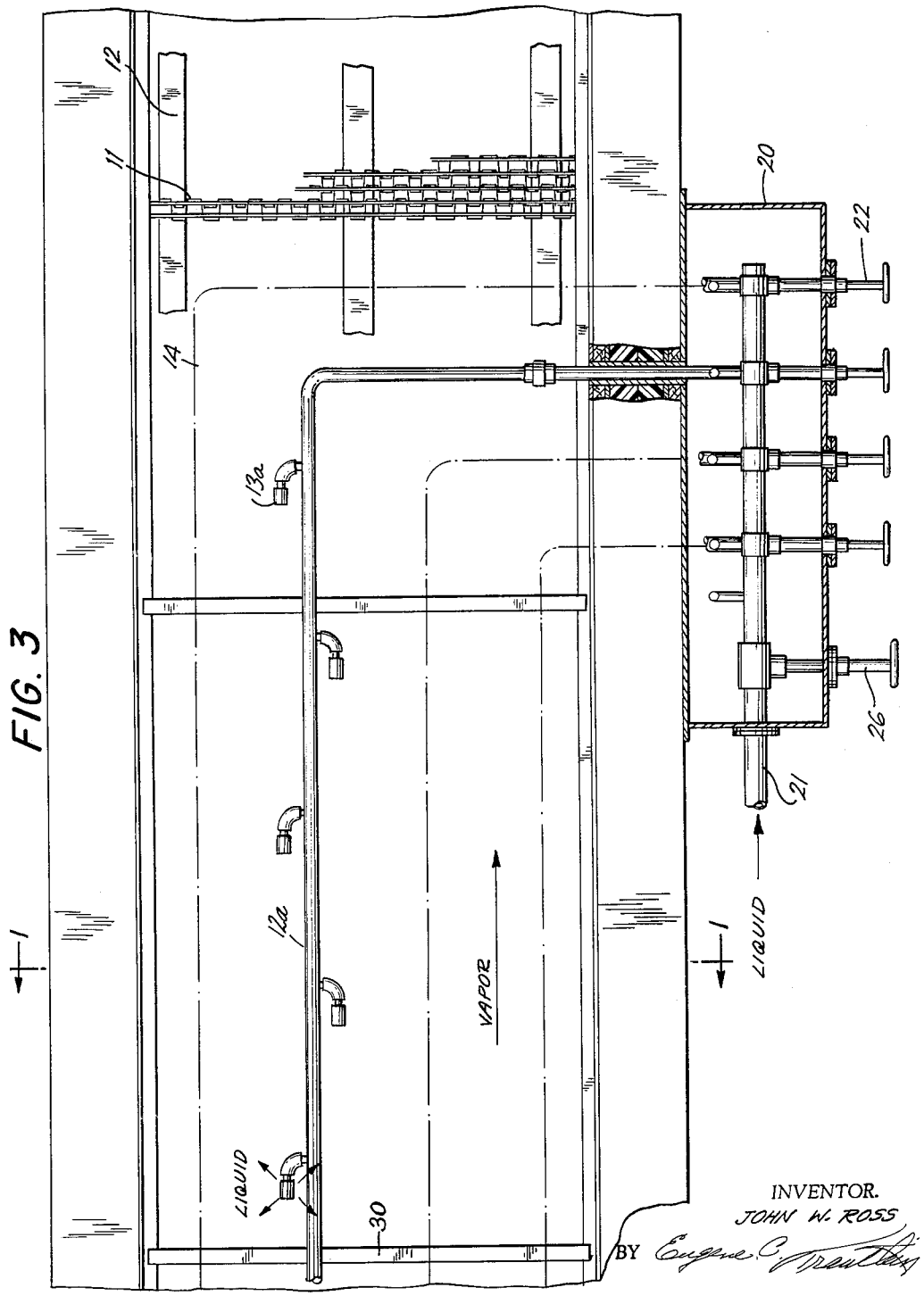

United States Patent Office 3,258,935
Patented July 5, 1966

3,258,935
FOOD FREEZING APPARATUS
John W. Ross, Toronto, Ontario, Canada, assignor to Union Carbide Canada Limited, a corporation of Canada
Filed May 27, 1963, Ser. No. 283,499
3 Claims. (Cl. 62—374)

This invention relates to improved food freezing apparatus and particularly to improved apparatus for freezing food in a continuous manner employing a liquefied refrigerant gas, such as liquid nitrogen, as the coolant.

Frozen foods, particularly frozen pre-cooked meals, are becoming increasingly important in the food industry since they are convenient and time saving for the consumer and offer advantages, such as the ability to be stored for prolonged periods of time without significant deterioration, to the merchandiser. However the apparatus available to date for freezing food have not been entirely satisfactory. One type of apparatus currently employed for freezing food consists of a blast freezing tunnel through which continuously pass carts containing food to be frozen and in which a high velocity current of cold air cooled by mechanical refrigerating means for freezing the food is provided. Apparatus of this type require large initial capital expenditures, occupy considerable space and require a relatively large number of operating personnel. A second type of apparatus currently employed for freezing food consists of an insulated cabinet in which the food to be frozen is supported on shelves and cooled with a liquefied refrigerant gas and/or its vapor (e.g. liquid nitrogen). Such apparatus suffer from the disadvantage that they are not adapted for the continuous freezing of food but rather operate in a batch-wise fashion. The development of food freezing apparatus combining the features of the above described apparatus presently in use (i.e. an apparatus wherein foods are frozen in a continuous manner with a liquefied refrigerant gas and/or its vapor) has not been entirely successful to date since the apparatus proposed to date have involved the use of excessive amounts of refrigerant, and have been plagued with mechanical difficulties resulting from the low temperatures to which the intricate moving parts are exposed.

An object of this invention is to provide a comparatively inexpensive, dependable and compact apparatus for continuously freezing food employing a relatively small amount of refrigerant and comparatively few operating personnel.

Other objects and advantages will be apparent from the ensuing disclosure, the appended claims and the figures in which:

FIGURE 1 is an end view, taken in cross section, of a novel food freezing apparatus of this invention.

FIGURE 2 is a side elevation view, showing the apparatus of FIGURE 1 on a reduced scale.

FIGURE 3 is a reduced scale plan view looking downward on the freezing zone and the equalizing zone of the apparatus of FIGURE 1 with the cover removed.

This invention provides a tunnel-type apparatus for freezing food wherein the food is carried on a conveyor belt from an entrance end to a discharge end of the tunnel and successively contacted with the cold vapor of a liquefied refrigerant gas and then with a liquefied refrigerant gas. The food is brought into contact with the liquefied refrigerant gas nearer the discharge or exit end of the tunnel and the contact between the liquefied refrigerant gas and the food is achieved by spraying the liquefied refrigerant gas from nozzles attached to a cooling conduit located in the upper portion of the tunnel. The nozzles are spaced so that the liquefied refrigerant gas film formed on the food by one nozzle has just evaporated at about the time the food comes in contact with the spray from the next nozzle. The cold vapor of liquefied refrigerant gas so produced is drawn toward the entrance end of the tunnel (e.g. by suction fans) and precools the food in the portion of the tunnel nearer the entrance. In this manner the sensible heat of the vapor is utilized. The warm vapor is then preferably vented to the atmosphere. The conveyor belt is driven by multiple sprockets located outside the tunnel and exposed to the atmosphere. When a plurality of cooling conduits are employed, liquefied refrigerant gas is preferably supplied to the cooling conduits from a single filling conduit and the filling conduit is below the level of the cooling conduit to promote uniform distribution of the refrigerant to each cooling conduit. In a preferred embodiment of this invention, the width of the conveyor belt is such that it can accommodate several parallel rows of containers for the food to be frozen and each such row of containers is associated with a separate cooling conduit.

FIGURE 1 shows an apparatus 1 for freezing food having a cover 2 and a conveyor belt housing 3. The outer walls 4a of cover 2 and the outer walls 4b of housing 3, taken together, define an outer shell while the inner walls 5a of cover 2 and the inner walls 5b of housing 3, taken together, define an inner shell. The outer shell is composed of suitable protective metal sheets readily kept in a sanitary condition, such as aluminum sheets, while the inner shell is composed of suitable, readily cleanable, metal sheets, such as stainless steel sheets. Between the outer shell and the inner shell are insulating spaces 6a and 6b which are filled with insulating material 7 (such as blocks of polystyrene foam or, preferably, rigid polyurethane foam) which are surrounded by intermediate shells 8a and 8b composed of plywood which provide rigidity and support. Preferably inner surface 5b is not rigidly fixed in position but is free to expand and contract ("float") with the fluctuations in temperature with the result that it does not undergo warpage or other deformation or cracking when cooled from ambient temperatures to the temperature of the liquefied refrigerant gas. Insulating strips 7a composed of polyethylene or other low thermally conductive material are provided to minimize the inleakage by conduction from outer surface 4a to inner surface 5a. The inner surfaces of intermediate shells 8a and 8b (i.e., the surfaces in contact with insulating material 7) are preferably coated with an asphaltic material 9 in order to hold the insulation in place and render the shells water vapor proof while a portion of the outer surface of intermediate shell 8b is preferably coated with an epoxide polymer 9a in order to minimize friction and to render the shell water vapor proof. The inner shell encloses insulated food freezing space or enclosure 10 which houses endless conveyer belt 11 composed of interconnected stainless steel links supported by parallel wear strips 12 composed of a suitable material of low coefficient of friction (such as Teflon or polyethylene). Strips 12 are in turn supported by the inner shell. The upper portion of intermediate shell 8b supports the inner shell and transmits the load of the inner shell, strips 12 and conveyer belt 11 to the bottom of housing 3 so that the insulation in space 6b is not load supporting. Containers 13 of food to be frozen are placed on conveyor belt 11 beneath parallel horizontal cooling conduits 12a having nozzles 13a which successively wet the food passing along the conveyer belt by applying thereto a spray of a liquefied refrigerant gas, such as nitrous oxide, liquid air, or preferably, liquid nitrogen. Gaskets 14 of neoprene or other suitable material help maintain a seal between cover 2 and housing 3. Cover 2 is readily removed from conveyor housing 3 for convenient access to the interior of housing 3 for purposes of maintenance, cleaning and the like. Preferably a dry, inert gas (e.g. nitrogen) at super-atmospheric pressure is maintained in insulating space 6b to minimize the the leak of atmospheric moisture into insulating space 6b. Such moisture would tend ultimately to impair the performance of insulating material 7. Such pressurized gas is readily introduced into insulating space 6b through vapor conduit 6c which is in gaseous communication with the vapor space of the storage vessel (not shown) holding the liquefied refrigerant gas supplied to the filling conduit 21 of FIGURE 2.

FIGURE 2 shows a suction fan 15 preferably located on the top of apparatus 1 near conveyer belt entrance 16. Fan 15 is in gaseous communication with food freezing space 10. Fan 15 continuously removes vapor of liquefied refrigerant gas from food freezing space 10 and thereby causes a flow of cold vapor of liquefied refrigerant gas toward the entrance 16 of apparatus 1 so as to precool the entering food in precooling zone 17 of food freezing space 10. The precooled food is then conveyed to freezing zone 18 of food freezing space 10 in which are located cooling conduit 12a. Then the food passes through equalizing zone 18a where any remaining refrigerant on the food vaporizes. The food emerges from apparatus 1 through conveyer exit 19. Mounted on the side of outer shell is control box 20 in which is located the junction of each cooling conduit 12a and filling conduit 21. Filing conduit 21 is below cooling conduits 12a to insure equal distribution of refrigerant to the multiple cooling conduits. Control box 20 is provided with individual cooling conduit flow control valves 22 and individual cooling conduit pressure gauges 23 as well as with filling conduit pressure gauge 24, which is associated with relief valve 25, and main filling conduit control valve 26. Filling conduit 21 is in liquid communication with a tank (not shown) in which is maintained a supply of liquefied refrigerant gas preferably pressurized by a vapor pressure created upon filling the tank. Filling conduit 21 preferably supplies liquefied refrigerant gas to cooling conduits 12a at a pressure from 2 p.s.i.g. to 5 p.s.i.g. to insure the production of an adequate flow to the nozzles (not shown). Means for driving conveyor belt 11, such as motor or variable speed drive 27 which is attached by drive belt 27a to drive sprockets 27b, are located outside of food freezing space 10 so as to avoid contact with any appreciable amount of liquefied refrigerant gas or its vapor. For similar reasons sprockets 27b and 27c are also located outside of food freezing space 10. The lower part of conveyor belt 11 is preferably also located outside of food freezing space 10 and in contact with the atmosphere to permit elimination of any ice formed thereon when passing through food freezing space 10. The lower surface of the outer shell is supported by support frame 28. The rate of movement of the food through the freezing zone 18 and the rate of application of the liquid refrigerant to the food from the nozzle is such that substantially all of the resulting liquefied refrigerant gas film has vaporized when the food emerges from the freezing zone 18a. Any unvaporized refrigerant vaporizes in equalizing zone 18a which also permits the temperature of the food to become uniform throughout the food (upon leaving the freezing zone 18 there is a tendency for the outer portion of the food to be colder than the inner portion).

When relatively thick foods (e.g. meat pies) are to be frozen, it is preferred that a portion of the lower surface of the inner shell be lower than the remaining portions of this surface so as to provide a depressed area 11a in which liquefied refrigerant gas is provided as a pool through which the food passes. Preferably the depth of the pool is such that the distance from the bottom of the food container in contact with the conveyor belt to the surface of the pool is equal to from one eighth to one half of the height of the food container. Such pools of refrigerant, together with the spray of refrigerant, provide for efficient and rapid freezing of such thick foods without involving excessive consumption of refrigerant and without cracking the food due to too rapid cooling. The liquid refrigerant in the pool in area 11a can be provided from a separate conduit which supplies the refrigerant in response to a liquid level control mechanism in the food freezing space.

FIGURE 3 shows control box 20, filling conduit 21, individual cooling conduit flow control valves 22, main filling conduit control valve 26 and cooling conduit 12a. Nozzles 13a are so spaced that the thin film of liquefied refrigerant gas applied to the food as a fine spray from each nozzle has just evaporated at about the time the food comes into contact with the spray from the next nozzle nearer the exit from the food freezing space. Preferably, the nozzles near the exit end of the apparatus have smaller orifice sizes than the remaining nozzles so as to obtain a uniform flow from each nozzle. Conveyor belt 11 is composed of interconnected stainless steel links. Parallel wear strips 12 are rigidly fastened at one end of the inner shell but are not fastened elsewhere so as to be free to expand and contract in response to the temperature changes. Control box 20 preferably contains an insulating material such as perlite. Support bars 30 support cooling conduits 12a.

The view of FIGURE 1 is taken along plane 1—1 of FIGURE 3.

The apparatus of this invention is generally applicable to freezing food and is particularly applicable to freezing cooked food such as cooked meat (e.g. chicken or beef) and cooked vegetables (e.g., peas, carrots and potatoes). Such foods are preferably passed through the apparatus of this invention in open top containers composed of plastic materials, such as polystyrene, or high thermal conducting materials, such as aluminum.

A typical apparatus of the invention was used to freeze pre-cooked dinners to 0° F. in open top aluminum containers, each holding a dinner composed of sliced turkey, mashed potatoes, peas, gravy and butter (the weight of each dinner was 11 ounces). The average amount of nitrogen required to freeze each dinner was 12 ounces and 1500 dinners were frozen over a period of about one hour. The conveyor belt speed was 4 feet per minute and the spacing of the nozzles on the cooling conduits was about 12 inches. The diameter of the orifice of the first eight nozzles in each cooling conduit was $1/16''$ and the diameter of the orifice of the last two nozzles in each cooling conduit was $3/64''$. The internal diameter of each of the four cooling conduits was 0.5 inch and the internal diameter of the filling conduit was 1.0 inch. The pre-cooling zone was 18 feet long, the freezing zone was 10 feet long and the equalizing zone was 4 feet long. The apparatus had four parallel cooling conduits each having 10 nozzles and the containers were passed through the apparatus four abreast, one row passing under each cooling conduit. Once started no operators were required to operate the apparatus. One person was required to load the food onto the conveyer belt and one person was required to remove the frozen food.

As used herein the term "vapor" is used as a synonym for the term "gas" and the term "conveyer belt" denotes any suitable means for carrying the food through the food freezing space or enclosure.

What is claimed is:

1. An apparatus for freezing relatively thick food comprising (1) an insulated food freezing space having a precooling zone and a freezing zone, (2) a depressed area in the bottom of the space for providing a place for a pool of a liquefied refrigerant gas to collect, the depth of the depressed area being such that the distance from the bottom of the food passing above the area to the surface of the pool is equal to from one eighth to one half of the height of the food, (3) a conveyor belt for carrying food into the space, through said zones and out of the space, (4) a cooling conduit disposed in the freezing zone and above the conveyor belt, said cooling conduit having its longitudinal axis parallel to the longitudinal axis of the conveyer belt and having a plurality of spray nozzles disposed to provide a spray of liquefied refrigerant gas for forming a thin liquefied refrigerant gas film on the food and spaced so that the film formed by one nozzle will have evaporated to produce a vapor by the time the food comes into contact with the spray from the next nozzle, (5) means for causing the vapor so produced to flow countercurrent to the food in the pre-cooling zone to pre-cool the food entering the apparatus, (6) means for removing the vapor from the food freezing space and (7) means located outside of the food freezing space for driving the conveyor belt.

2. An apparatus for freezing food comprising (1) an outer shell, (2) a metallic inner shell having an upper half and a lower half, said lower half being free to expand and contract due to temperature changes, (3) an insulating space between said shells filled with an insulating material, (4) an insulated food freezing space located within the inner shell and having a pre-cooling zone and a freezing zone, (5) a conveyor belt for carrying food into the space through said zones and out of the space, (6) a cooling conduit disposed in the freezing zone and above the conveyor belt, said cooling conduit having its longitudinal axis parallel to the longitudinal axis of the conveyer belt and having a plurality of spray nozzles disposed to provide a spray of liquefied refrigerant gas for forming a thin liquefied refrigerant film on the food and spaced so that the film formed by one nozzle will have evaporated to produce a vapor by the time the food comes into contact with the spray from the next nozzle, (7) a filling conduit in fluid communication with the cooling conduit for supplying liquefied refrigerant gas at a pressure from 2 p.s.i.g. to 5 p.s.i.g. to the cooling conduit from below the cooling conduit, (8) a suction blower located above the pre-cooling zone and in vapor communication with the pre-cooling zone near the point where the conveyor enters the pre-cooling zone for causing the vapor so produced to flow countercurrent to the food in the pre-cooling zone to pre-cool the food entering the apparatus, and for removing the vapor from the food freezing space and (9) means located outside of the food freezing space for driving the conveyor belt, said liquid refrigerant gas being liquid nitrogen.

3. The apparatus of claim 2 wherein a superatmospheric pressure of a dry, inert gas is maintained in the insulating space to minimize the leak of water vapor into the insulating space, wherein the conveyor belt is composed of interconnected stainless steel links, and wherein the orifices of the nozzles nearer the exit end of the insulated space are smaller in diameter than the remaining nozzles.

References Cited by the Examiner

UNITED STATES PATENTS

| | | | |
|---|---|---|---|
| 2,080,103 | 5/1937 | Zarotschenzeff | 62—64 X |
| 2,447,249 | 8/1948 | Hill | 62—63 |
| 2,555,502 | 6/1951 | Morrison | 62—64 X |
| 2,724,950 | 11/1955 | Rothwell | 62—373 X |
| 2,817,124 | 12/1957 | Dybvig | 62—531 |
| 2,951,353 | 9/1960 | Morrison | 62—63 |
| 3,022,636 | 2/1962 | Morrison | 62—64 |
| 3,039,276 | 6/1962 | Morrison | 62—64 |
| 3,048,989 | 8/1962 | Morrison | 62—64 |

EDWARD J. MICHAEL, *Primary Examiner.*